US008856888B2

(12) United States Patent
Yamada

(10) Patent No.: US 8,856,888 B2
(45) Date of Patent: Oct. 7, 2014

(54) PERSONAL AUTHENTICATION APPARATUS AND PERSONAL AUTHENTICATION METHOD

(75) Inventor: Kazunori Yamada, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/808,348

(22) PCT Filed: May 18, 2012

(86) PCT No.: PCT/JP2012/003268
§ 371 (c)(1),
(2), (4) Date: Jan. 4, 2013

(87) PCT Pub. No.: WO2013/008378
PCT Pub. Date: Jan. 17, 2013

(65) Prior Publication Data
US 2013/0326592 A1  Dec. 5, 2013

(30) Foreign Application Priority Data

Jul. 12, 2011  (JP) ................................ 2011-154328

(51) Int. Cl.
| H04L 29/06 | (2006.01) |
| G06F 21/34 | (2013.01) |
| H04M 1/67 | (2006.01) |
| H04W 12/06 | (2009.01) |
| H04L 9/32 | (2006.01) |
| G06F 21/32 | (2013.01) |
| H04W 88/02 | (2009.01) |

(52) U.S. Cl.
CPC ............ *H04L 63/08* (2013.01); *G06F 21/34* (2013.01); *H04M 1/67* (2013.01); *H04W 12/06* (2013.01); *G06F 2221/2111* (2013.01); *H04L 9/3226* (2013.01); *H04L 9/3234* (2013.01); H04L 2209/80 (2013.01); *H04W 88/02* (2013.01); *G06F 21/32* (2013.01)
USPC ..................................... 726/4; 726/7; 600/595

(58) Field of Classification Search
CPC ... H04L 9/3231; H04L 63/0861; G06F 21/00; G06F 21/31; G06F 21/32; G06F 2221/2111; G06F 21/554

USPC .......................................... 726/4, 7; 600/595
See application file for complete search history.

(56) References Cited

U.S. PATENT DOCUMENTS

| 7,636,853 | B2 | 12/2009 | Cluts et al. |
| 2004/0153656 | A1 | 8/2004 | Cluts et al. |

(Continued)

FOREIGN PATENT DOCUMENTS

| JP | 2000-200315 | 7/2000 |
| JP | 2004-234665 | 8/2004 |

(Continued)

OTHER PUBLICATIONS

Derawi, M. O., Nickel, C., Bours, P., & Busch, C. (Oct. 2010). Unobtrusive user-authentication on mobile phones using biometric gait recognition. In Intelligent Information Hiding and Multimedia Signal Processing (IIH-MSP), 2010 Sixth International Conference on (pp. 306-311). IEEE.*

(Continued)

*Primary Examiner* — Catherine Thiaw
*Assistant Examiner* — Syed Zaidi
(74) *Attorney, Agent, or Firm* — Wenderoth, Lind & Ponack, L.L.P.

(57) ABSTRACT

A personal authentication apparatus that controls an authenticated state of a target device based on the motion of the target device includes a motion sensor that detects motion information indicating the motion of the target device, a carried-state determination unit configured to determine whether or not the target device is being carried by a user based on the detected motion information, and an authentication control unit configured to control the authenticated state of the target device based on a result of the determination by the carried-state determination unit.

12 Claims, 11 Drawing Sheets

(56) References Cited

U.S. PATENT DOCUMENTS

| | | |
|---|---|---|
| 2008/0305771 A1 | 12/2008 | Yajima et al. |
| 2012/0159590 A1* | 6/2012 | Novack et al. ............. 726/7 |
| 2012/0191016 A1* | 7/2012 | Jastram ................. 600/595 |

FOREIGN PATENT DOCUMENTS

| | | |
|---|---|---|
| JP | 2007-13546 | 1/2007 |
| JP | 2008-306412 | 12/2008 |
| JP | 2009-127244 | 6/2009 |
| JP | 2010-44639 | 2/2010 |
| JP | 2010-117999 | 5/2010 |
| JP | 2011-87031 | 4/2011 |
| WO | WO 2011003181 A1 * | 1/2011 |

OTHER PUBLICATIONS

Mantyjarvi, Jani, et al. "Identifying users of portable devices from gait pattern with accelerometers." Acoustics, Speech, and Signal Processing, 2005. Proceedings.(ICASSP'05). IEEE International Conference on. vol. 2. IEEE, 2005.*

Gafurov, Davrondzhon, Kirsi Helkala, and Torkjel SØndrol. "Biometric gait authentication using accelerometer sensor." Journal of computers 1.7 (2006): 51-59.*

International Search Report issued Jun. 26, 2012 in corresponding International Application No. PCT/JP2012/003268.

* cited by examiner

PERSONAL AUTHENTICATION APPARATUS AND PERSONAL AUTHENTICATION METHOD

TECHNICAL FIELD

The present invention relates to a personal authentication apparatus and a personal authentication method that control an authenticated state of a target device based on motion information of the target device.

BACKGROUND ART

Recent mobile devices, as typified by smart phones, are increasingly multifunctional and store a variety of information therein. Accordingly, a security function for protecting stored information from unauthorized operations or the like by a third party is essential for such mobile devices.

Generally, the security function is implemented by execution of personal authentication (hereinafter also referred to simply as "authentication") using a password when, for example, the device is activated or returns from its suspended mode. However, the password input operation is troublesome, and imposes a significant burden on the user.

The security function may also be implemented by biometric authentication that uses biometric information such as fingerprints. In this case, if a copy of the biometric information is made, authentication will be successful by using the copy, which in turn results in reduced security. Also, the apparatus for performing biometric authentication results in cost burden.

In view of the above, a method has been proposed in which a mobile device automatically performs personal authentication by utilizing the fact that the motion of a mobile device detected while the user is walking varies from user to user (see, for example, Patent Literature (PTL) 1). PTL 1 discloses a method for controlling an authenticated state of a mobile device by comparing acceleration information detected by an acceleration sensor included in the mobile device with a walking pattern indicating acceleration information of when the user who should be successfully authenticated (hereinafter referred to as the "authenticated user") is walking.

CITATION LIST

Patent Literature

[PTL 1] Japanese Unexamined Patent Application Publication No. 2010-44639

SUMMARY OF INVENTION

Technical Problem

However, with the conventional method described above, it is desired to further appropriately control personal authentication based on the motion of the target device.

In view of the above, it is an object of the present invention to provide a personal authentication apparatus and a personal authentication method that can appropriately control personal authentication based on the motion of the target device.

Solution to Problem

In order to achieve the above object, a personal authentication apparatus according to one aspect of the present invention is a personal authentication apparatus that controls an authenticated state of a target device based on motion of the target device, the apparatus including: a motion sensor that detects motion information indicating the motion of the target device; a carried-state determination unit configured to determine whether or not the target device is being carried by a user based on the detected motion information; and an authentication control unit configured to control the authenticated state of the target device based on a result of the determination by the carried-state determination unit.

These general and specific aspects may be implemented using a system, a method, an integrated circuit, a computer program, or a computer-readable recording medium such as a CD-ROM (Compact Disc Read Only Memory), or any combination of systems, methods, integrated circuits, computer programs, or computer-readable recording media.

Advantageous Effects of Invention

According to an aspect of the present invention, it is possible to appropriately control personal authentication based on the motion of a target device.

BRIEF DESCRIPTION OF DRAWINGS

FIG. 1 is a block diagram showing a functional configuration of a personal authentication apparatus according to Embodiment 1.
FIG. 2 is a flowchart illustrating processing operations of the personal authentication apparatus according to Embodiment 1.
FIG. 3 is a graph showing an example of transition of the degree of confidence according to Embodiment 1.
FIG. 4 is a block diagram showing a functional configuration of a personal authentication apparatus according to Embodiment 2.
FIG. 5 is a flowchart illustrating processing operations of the personal authentication apparatus according to Embodiment 2.
FIG. 6 is a diagram illustrating walking pattern storing processing according to Embodiment 2.
FIG. 7 is a block diagram showing a functional configuration of a personal authentication apparatus according to Embodiment 3.
FIG. 8 is a flowchart illustrating processing operations of the personal authentication apparatus according to Embodiment 3.
FIG. 9 is a diagram showing an example of content displayed on a screen in Embodiment 3.
FIG. 10 is a block diagram showing a functional configuration of a personal authentication apparatus according to Embodiment 4.
FIG. 11 is a flowchart illustrating processing operations of the personal authentication apparatus according to Embodiment 4.
FIG. 12 is a block diagram showing a functional configuration of a personal authentication apparatus according to Embodiment 5.
FIG. 13 is a flowchart illustrating processing operations of the personal authentication apparatus according to Embodiment 5.

Figure 1:
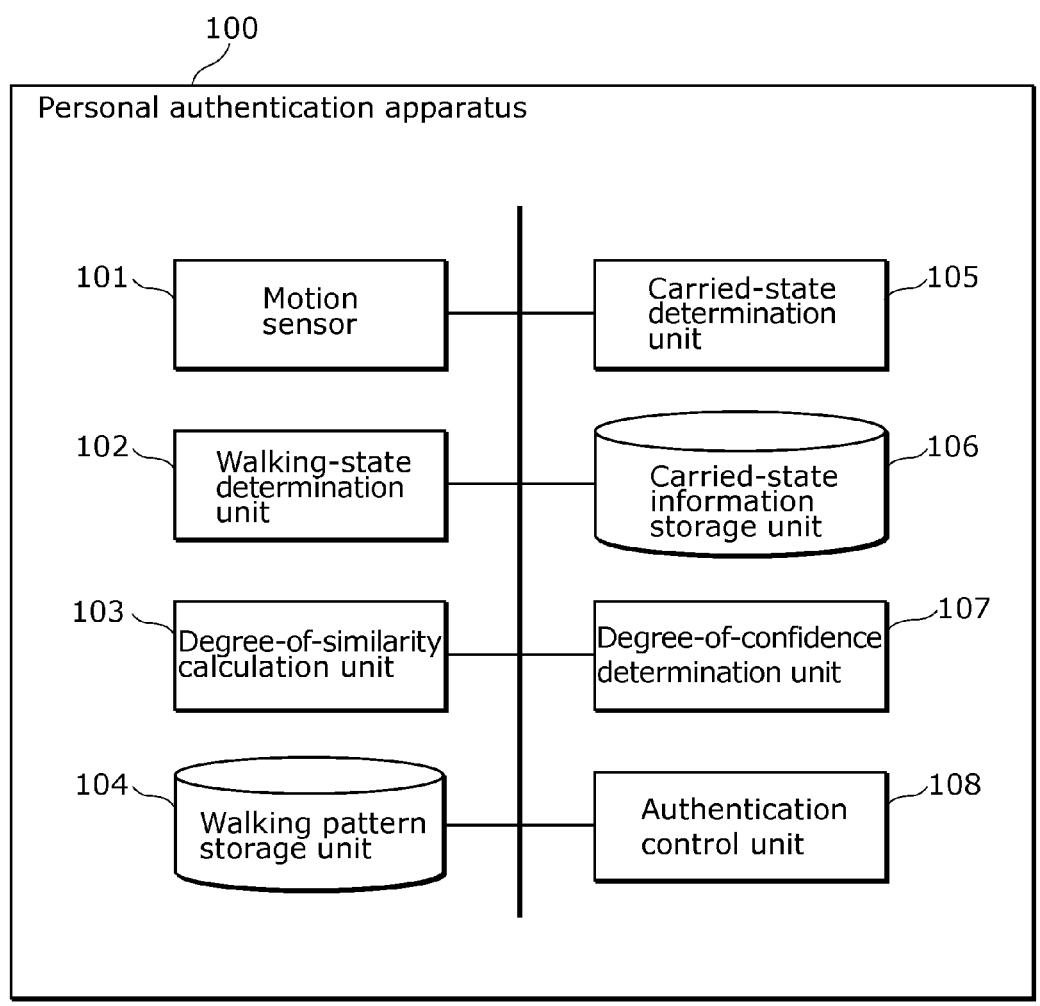
[FIG. 1]

DESCRIPTION OF EMBODIMENTS (Underlying Knowledge Forming Basis of the Present Invention)

The present inventors found that the following problems occur when personal authentication is controlled based on the motion of a target device.

The walking pattern can vary, even for the same user, depending on the user's shoes, the floor on which the user is walking, the user's health condition, the user's manner of walking or the like. Accordingly, with the method disclosed in PTL 1, a situation can occur in which authentication fails even if the user carrying the mobile device is an authenticated user. Also, authentication based on the walking pattern does not function effectively when the user is not walking.

That is, the method of PTL 1 is problematic in that authentication will not be successful when the user is not walking or when the user is walking with a walking pattern different from the walking pattern that has been learned in advance. If authentication fails, the user has to try to be successfully authenticated with another authentication method, compromising the convenience of the user. In other words, with the conventional method, it is difficult to appropriately control personal authentication based on the motion of the target device.

To address this, a personal authentication apparatus according to an aspect of the present invention is a personal authentication apparatus that controls an authenticated state of a target device based on motion of the target device, the apparatus including: a motion sensor that detects motion information indicating the motion of the target device; a carried-state determination unit configured to determine whether or not the target device is being carried by a user based on the detected motion information; and an authentication control unit configured to control the authenticated state of the target device based on a result of the determination by the carried-state determination unit.

With this configuration, the authenticated state of the target device is controlled based on the result of determination as to whether or not the target device is being carried by the user. Accordingly, for example, it is possible to prevent a situation in which the target device is left unattended while the target device is in the authenticated state, and thus personal authentication can be appropriately controlled based on the motion of the target device.

For example, the personal authentication apparatus may further include a degree-of-confidence determination unit configured to determine a degree of confidence that indicates a level of certainty that the target device is being carried by an authenticated user based on the result of the determination by the carried-state determination unit, wherein the authentication control unit is configured to control the authenticated state of the target device based on the determined degree of confidence, and the degree-of-confidence determination unit is configured to: (i) determine a value that is smaller than a previous degree of confidence by a first predetermined value as the degree of confidence when it is determined that the target device is being carried by the user; and (ii) determine a value that is smaller than the previous degree of confidence by a second predetermined value that is greater than the first predetermined value as the degree of confidence when it is determined that the target device is not being carried by the user.

With this configuration, when the target device is being carried by the user, it is possible to determine a value that is smaller than the previous degree of confidence by a first predetermined value, as the degree of confidence. Furthermore, when the target device is not being carried by the user, it is possible to determine a value that is smaller than the previous degree of confidence by a second predetermined value that is greater than the first predetermined value, as the degree of confidence. That is, the degree of confidence can be lowered more rapidly when the target device is not being carried by the user than when the target device is being carried by the user. By performing personal authentication based on the degree of confidence determined in this manner, it is possible to improve the success rate of personal authentication while suppressing a reduction in security.

For example, the personal authentication apparatus may further include a walking-state determination unit configured to determine whether or not the target device is being carried by the user while the user is walking based on the detected motion information, and a degree-of-similarity calculation unit configured to calculate a degree of similarity between the detected motion information and a walking pattern of the authenticated user stored in a walking pattern storage unit when it is determined that the target device is being carried by the user while the user is walking, wherein the degree-of-confidence determination unit is configured to: (i) determine the degree of confidence based on the calculated degree of similarity when it is determined that the target device is being carried by the user while the user is walking; (ii) determine a value that is smaller than the previous degree of confidence by the first predetermined value as the degree of confidence when it is determined that the target device is not being carried by the user while the user is walking and it is also determined that the target device is being carried by the user; and (iii) determine a value that is smaller than the previous degree of confidence by the second predetermined value as the degree of confidence when it is determined that the target device is not being carried by the user while the user is walking and it is also determined that the target device is not being carried by the user.

With this configuration, even in the case where the target device is not being carried by the user while the user is walking, it is possible to determine, as the degree of confidence, a value that is smaller than the previous degree of confidence by a first predetermined value, if the target device is being carried by the user. Accordingly, by appropriately setting the first predetermined value, personal authentication can be made successful even when the user who is carrying the target device is not walking, and the success rate of personal authentication can be improved. Furthermore, if the state in which the target device is not carried by the user while the user is walking continues, the degree of confidence is decreased by the first predetermined value, and it is therefore possible to suppress a reduction in security. Furthermore, when the target device is not being carried by the user, a value that is smaller than the previous degree of confidence by a second predetermined value that is greater than the first predetermined value is determined as the degree of confidence. Accordingly, the degree of confidence can be sufficiently decreased between the state in which the target device is not carried by the user and the state in which the target device is carried by the user, and it is therefore possible to improve security.

For example, when it is determined that the target device is being carried by the user while the user is walking, the degree-of-confidence determination unit may be configured to: (i) determine the degree of similarity as the degree of confidence when the degree of similarity is greater than or equal to a value that is smaller than the previous degree of confidence by a third predetermined value that is smaller than the first and second predetermined values; and (ii) determine the value that is smaller than the previous degree of confidence by the third predetermined value as the degree of confidence when the degree of similarity is less than the value that is smaller than the previous degree of confidence by the third predetermined value.

With this configuration, in the case where the target device is being carried by the user while the user is walking, when the degree of similarity is less than a value that is smaller than the previous degree of confidence by a third predetermined value, it is possible to determine the value that is smaller than the previous degree of confidence by the third predetermined value, as the degree of confidence. Accordingly, even when the user walks with a walking pattern that is significantly different from the walking patterns stored in the walking pattern storage unit, personal authentication can be made successful, and it is therefore possible to improve the success rate of personal authentication.

For example, the personal authentication apparatus may further include a walking pattern storing unit configured to store a new walking pattern into the walking pattern storage unit, wherein the walking pattern storing unit includes: a specifying unit configured to specify as a first time period, by referring to history data of the motion information, the degree of similarity and the degree of confidence, a time period in which it has been determined that (i) the degree of similarity is less than a first threshold value, (ii) the degree of confidence is greater than or equal to a second threshold value and (iii) the target device is being carried by the user while the user is walking; and a storing unit configured to store the new walking pattern into the walking pattern storage unit based on the motion information detected during the first time period, when a second time period includes a third time period in which the degree of confidence is greater than or equal to a third threshold value that is greater than the second threshold value, the second time period being a time period that includes the first time period and in which it has been continuously determined that the target device is being carried by the user while the user is walking.

With this configuration, new walking patterns can be stored by using the history data. Accordingly, the number of walking patterns of the authenticated user can be increased, as a result of which the success rate of personal authentication can be improved.

For example, the personal authentication apparatus may further include a first display unit configured to display the first time period on a screen, and a first input unit configured to receive, from the user, first instruction information for instructing storage of the new walking pattern based on the motion information detected during the displayed first time period, wherein the storing unit is configured to store the new walking pattern into the walking pattern storage unit when (i) the second time period includes the third time period and (ii) the first instruction information is received.

With this configuration, a new walking pattern can be stored when first instruction information is received from the user. Accordingly, it is possible to suppress a situation in which an inappropriate walking pattern is stored as a walking pattern of the authenticated user, as a result of which the security of personal authentication can be improved.

For example, the authentication control unit may be configured to continue the authenticated state of the target device when it is determined that the target device is being carried by the user while the target device is in the authenticated state.

With this configuration, it is possible to continue the authenticated state of the target device when it has been determined that the target device is being carried by the user. Accordingly, the convenience of the user can be improved while suppressing a reduction in security.

For example, the authentication control unit may change the state of the target device from the authenticated state to the non-authenticated state if it has been determined that the target device is not being carried by the user when the target device is in the authenticated state.

With this configuration, the authenticated state of the target device can be suspended when it has been determined that the target device is not being carried by the user. Accordingly, it is possible to prevent the target device from being left unattended while the target device is in the authenticated state, and thus a reduction in security can be suppressed.

For example, the personal authentication apparatus may further include: a carried-period specifying unit configured to specify as a carried period, a time period in which it has been determined that the target device is being carried by the user, by referring to the history data of the motion information; a second display unit configured to display the specified carried period to the user; a second input unit configured to receive, from the user, second instruction information for instructing storage of non-carried-state information into a carried-state information storage unit based on the motion information detected during the displayed carried period, the non-carried-state information indicating motion information of when the target device is not being carried by the user; and a carried-state information storing unit configured to store the non-carried-state information into the carried-state information storage unit based on the motion information detected during the carried period when the second instruction information has been received, wherein the carried-state determination unit is configured to determine whether or not the target device is being carried by the user by using the non-carried-state information stored in the carried-state information storage unit.

With this configuration, the non-carried-state information can be stored by using the history data. In the case where the target device has been left in a train, for example, the target device will vibrate, making it likely that it is erroneously determined that the target device is being carried by the user. As described above, the non-carried-state information can be stored by using the motion information detected when it has been erroneously determined that the target device is being carried by the user, and it is therefore possible to improve the accuracy of determination of the carried state as well as improving the security of personal authentication.

For example, the motion sensor may be an acceleration sensor, and the carried-state determination unit may be configured to determine that the target device is not being carried by the user when an acceleration indicated by the motion information is less than or equal to a threshold value for a predetermined length of time.

With this configuration, as a result of the threshold value and the predetermined length of time being appropriately set, it is possible to determine with high accuracy whether or not the target device is being carried by the user.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, a personal authentication apparatus according to an aspect of the present invention will be described in detail with reference to the drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the claims. Therefore, among the structural elements in the following embodiments, structural elements not recited in any one of the independent claims are described as arbitrary structural elements.

[Embodiment 1]

FIG. 1 is a block diagram showing a functional configuration of a personal authentication apparatus 100 according to Embodiment 1. An exemplary implementation of the personal authentication apparatus 100 is a mobile device such as a cell phone or a smart phone. An example will be described below in which the target device is a mobile device, and the personal authentication apparatus 100 is mounted in the mobile device.

The personal authentication apparatus 100 controls an authenticated state of the mobile device based on the motion of the mobile device. As shown in FIG. 1, the personal authentication apparatus 100 includes a motion sensor 101, a walking-state determination unit 102, a degree-of-similarity calculation unit 103, a walking pattern storage unit 104, a carried-state determination unit 105, a carried-state information storage unit 106, a degree-of-confidence determination unit 107 and an authentication control unit 108.

The motion sensor 101 detects motion information indicating the motion of the mobile device. Specifically, the motion sensor 101 is, for example, an acceleration sensor, an angular velocity sensor or a combination thereof.

The motion sensor 101 can be any sensor as long as it is possible to acquire information that can be used to detect that the mobile device has moved. For example, the motion sensor 101 may be a geomagnetic sensor, a pressure sensor or the like. Alternatively, the motion sensor 101 may be, for example, a combination of at least two of an acceleration sensor, an angular velocity sensor, a geomagnetic sensor and a pressure sensor.

The walking-state determination unit 102 determines whether or not the mobile device is carried by the user while the user is walking based on the motion information of the mobile device detected by the motion sensor 101. Here, the state in which the mobile device is being carried by a user while the user is walking is referred to as the "walking state". For example, the walking-state determination unit 102 determines whether or not the mobile device is in the walking state by determining whether or not the acceleration of the mobile device changes in a predetermined cycle.

If it is determined by the walking-state determination unit 102 that the mobile device is being carried by the user while the user is walking, the degree-of-similarity calculation unit 103 calculates the degree of similarity between a walking pattern of the authenticated user stored in the walking pattern storage unit 104 and the motion information detected by the motion sensor 101. As used herein, the degree of similarity refers to an indicator of how similar the motion information and the walking pattern are.

The walking pattern storage unit 104 stores the walking pattern of the authenticated user. The walking pattern of the authenticated user indicates motion information detected by the motion sensor 101, when the mobile device is being carried by a user who should be successfully authenticated and the user is walking. The walking pattern storage unit 104 may store a plurality of walking patterns, or may store walking patterns of a plurality of authenticated users.

If it is determined by the walking-state determination unit 102 that the mobile device is not being carried by the user while the user is walking, the carried-state determination unit 105 determines whether or not the mobile device is being carried by the user based on the motion information detected by the motion sensor 101. Here, the state in which the mobile device is being carried by a user is referred to as the "carried state". In the present embodiment, the carried-state determination unit 105 determines whether or not the mobile device is in the carried state by using carried-state information stored in the carried-state information storage unit 106.

For example, the carried-state determination unit 105 determines that the mobile device is not in the carried state if the acceleration indicated by the motion information detected by the motion sensor 101 is less than a predetermined threshold value for a predetermined length of time. In this case, the predetermined threshold value and the predetermined length of time may be stored in the carried-state information storage unit 106 as carried-state information.

The carried-state information storage unit 106 stores carried-state information for determining the carried state. The carried-state information is, for example, a condition that is to be satisfied by the motion information detected when the mobile device is in the carried state. Alternatively, the carried-state information may be a condition that is to be satisfied by the motion information detected when the mobile device is not in the carried state.

The degree-of-confidence determination unit 107 determines the degree of confidence based on the result of the walking state determination, the degree of similarity and the result of the carried-state determination. The degree of confidence refers to the level of certainty that the mobile device is being carried by an authenticated user. That is, the degree of confidence increases as the possibility that the mobile device is being carried by an authenticated user increases.

Specifically, the degree-of-confidence determination unit 107 determines the degree of confidence as follows.

(i) If it is determined that the mobile device is being carried by the user while the user is walking, the degree-of-confidence determination unit 107 determines the degree of confidence based on the degree of similarity calculated by the degree-of-similarity calculation unit 103. Specifically, if the degree of similarity is greater than or equal to a value that is smaller than the previous degree of confidence by a third predetermined value, the degree-of-confidence determination unit 107 determines the degree of similarity as the degree of confidence. If, on the other hand, the degree of similarity is less than the value that is smaller than the previous degree of confidence by the third predetermined value, the degree-of-confidence determination unit 107 determines the value that is smaller than the previous degree of confidence by the third predetermined value, as the degree of confidence. As used herein, the previous degree of confidence refers to the degree of confidence determined at the time immediately before by the degree-of-confidence determination unit 107.

(ii) If it is determined that the mobile device is not being carried by the user while the user is walking and it is also determined that the mobile device is being carried by the user, the degree-of-confidence determination unit 107 determines a value that is smaller than the previous degree of confidence by a first predetermined value, as the degree of confidence.

(iii) If it is determined that the mobile device is not being carried by the user while the user is walking and it is also determined that the mobile device is not being carried by the user, the degree-of-confidence determination unit 107 determines a value that is smaller than the previous degree of confidence by a second predetermined value, as the degree of confidence.

The first, second and third predetermined values are values that are greater than or equal to 0, and it is sufficient that the predetermined values are set in advance so as to be greater in the following order: the third predetermined value, the first predetermined value and the second predetermined value (0≤third predetermined value<first predetermined value< second predetermined value). The first, second and third predetermined values do not necessarily need to be fixed values and may vary depending on the magnitude of the degree of confidence.

The authentication control unit 108 controls the authenticated state of the mobile device based on the degree of confidence determined by the degree-of-confidence determination unit 107. For example, if the degree of confidence is greater than or equal to a predetermined authentication threshold value, the authentication control unit 108 allows personal authentication to succeed. In this case, the mobile device enters an authenticated state. If, on the other hand, the degree of confidence is less than the predetermined authentication threshold value, the authentication control unit 108 causes personal authentication to fail. In this case, the mobile device enters a non-authenticated state.

As used herein, the authenticated state refers to the state in which the use of a plurality of functions of the mobile device is not restricted. The non-authenticated state refers to the state in which the use of at least some of the plurality of functions of the mobile device is restricted.

Here, two states are described, namely, the authenticated state and the non-authenticated state, but the authenticated state may be divided into a plurality of levels on which different functions are available. The authenticated state may be divided into a plurality of levels such as, for example, level 1 of the authenticated state in which all functions are available and level 2 in which available functions are restricted compared with level 1.

Next is a description of various operations of the personal authentication apparatus 100 configured as described above.

Figure 2:
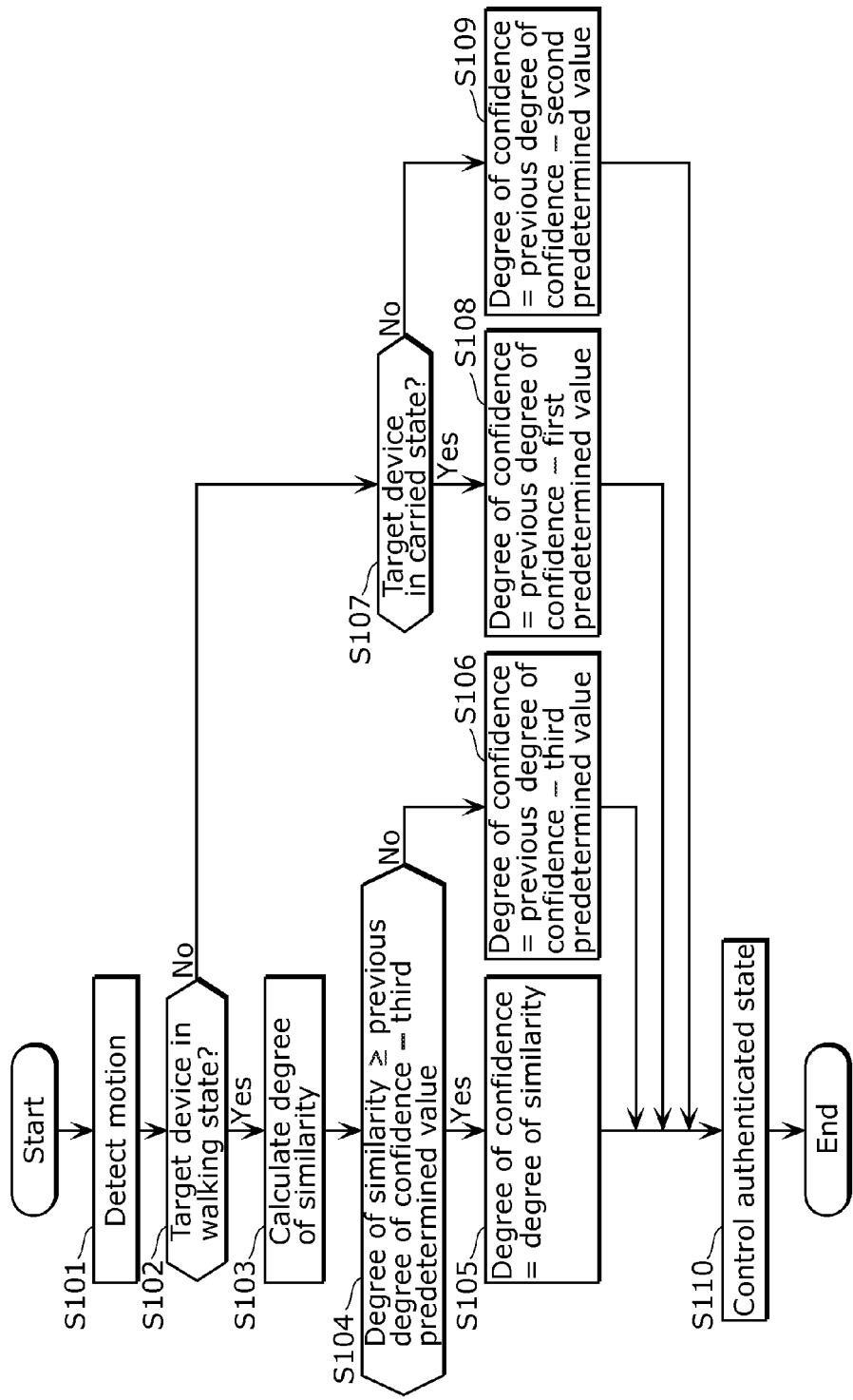
[FIG. 2]

FIG. 2 is a flowchart illustrating processing operations of the personal authentication apparatus 100 according to Embodiment 1. Specifically, FIG. 2 shows a sequence of operations of personal authentication processing. The series of processing shown in FIG. 2 is repeatedly executed, for example, at a fixed interval. The fixed interval is, for example, approximately 10 ms.

First, the motion sensor 101 detects motion information of the mobile device (S101). Then, the motion sensor 101 outputs the motion information of the mobile device to the walking-state determination unit 102, the degree-of-similarity calculation unit 103 and the carried-state determination unit 105.

The walking-state determination unit 102 then determines whether or not the mobile device is being carried by a user and the user is walking, based on the motion information detected by the motion sensor 101 (S102). In other words, the walking-state determination unit 102 determines whether or not the mobile device is in the walking state based on the motion information of the mobile device.

If it is determined that the mobile device is in the walking state (Yes in S102), the degree-of-similarity calculation unit 103 performs pattern matching between the walking pattern of the authenticated user stored in the walking pattern storage unit 104 and the motion information, and calculates the degree of similarity (S103). At this time, it is preferable that the pattern matching is performed by using, for example, motion information having a length of 500 ms or more. This is because the time interval required for a single step taken in walking is generally around 400 to 600 ms.

The degree-of-confidence determination unit 107 determines whether or not the calculated degree of similarity is greater than or equal to a value that is smaller than the previous degree of confidence by a third predetermined value (S104). If it is determined that the degree of similarity is greater than or equal to the value that is smaller than the previous degree of confidence by the third predetermined value (Yes in S104), the degree-of-confidence determination unit 107 determines the degree of similarity as the degree of confidence (S105). If, on the other hand, the degree of similarity is less than the value that is smaller than the previous degree of confidence by the third predetermined value (No in S104), the degree-of-confidence determination unit 107 determines the value that is smaller than the previous degree of confidence by the third predetermined value, as the degree of confidence (S106).

If, on the other hand, it is determined that the mobile device is not in the walking state (No in S102), the carried-state determination unit 105 determines whether or not the mobile device is being carried by a user based on the motion information by using carried-state information stored in the carried-state information storage unit 106 (S107). In other words, the carried-state determination unit 105 determines whether or not the mobile device is in the carried state.

If it is determined that the mobile device is in the carried state (Yes in S107), the degree-of-confidence determination unit 107 determines a value that is smaller than the previous degree of confidence by a first predetermined value, as the degree of confidence (S108). If, on the other hand, it is determined that the mobile device is not in the carried state (No in S107), the degree-of-confidence determination unit 107 determines a value that is smaller than the previous degree of confidence by a second predetermined value, as the degree of confidence (S109).

A specific example of transition of the degree of confidence determined as shown in FIG. 2 will now be described with reference to FIG. 3.

Figure 3:
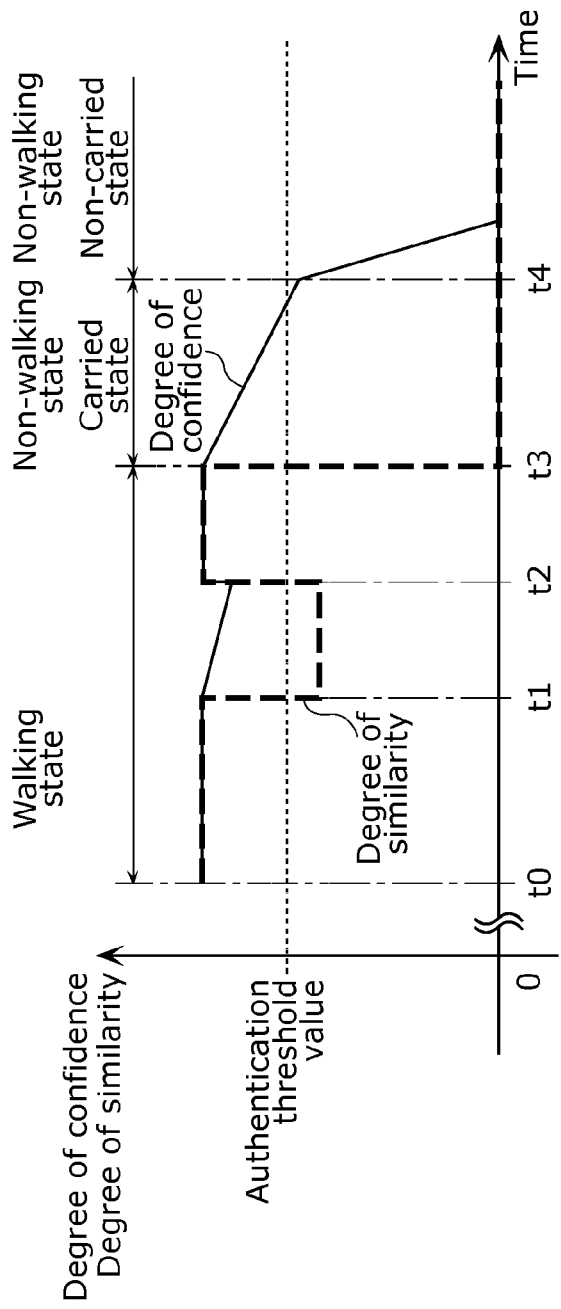
[FIG. 3]

FIG. 3 is a graph showing an example of transition of the degree of confidence according to Embodiment 1. In FIG. 3, the horizontal axis indicates time, and the vertical axis indicates the magnitude of the degree of confidence or the degree of similarity. The degree of confidence is indicated by a solid line, and the degree of similarity is indicated by a broken line.

Also, the authentication threshold value in the graph is the threshold value for determining whether or not to permit personal authentication depending on the degree of confidence. If the degree of confidence is above the authentication threshold value, personal authentication of the mobile device will be successful. If the degree of confidence is below the authentication threshold value, the personal authentication of the mobile device will fail.

In the example shown in FIG. 3, it is assumed that a user is carrying the mobile device in his/her pocket or bag. In a time period from time t0 to time t1, the user is walking straight forward in a relatively steady manner (walking state). Accordingly, in this time period, the degree of similarity calculated by matching between the motion information and the walking pattern is above the authentication threshold value. Thus, the degree of confidence obtained from the degree of similarity is also above the authentication threshold value, and therefore personal authentication of the mobile device by using the degree of confidence is successful.

In a time period from time t1 to time t2, the user is walking, swaying from side to side, through crowds of people or the like (walking state). Accordingly, in this time period, the degree of similarity falls below the authentication threshold value. The degree of confidence, however, decreases gradually by a third predetermined value, and therefore the degree of confidence is maintained at a level above the authentication threshold value. That is, personal authentication of the mobile device by using the degree of confidence is successful.

In a time period from time t2 to time t3, the user is again walking straight forward in a relatively steady manner (walking state). Accordingly, in this time period, the degree of similarity rises above the authentication threshold value, and the degree of confidence obtained from the degree of similarity also rises above the authentication threshold value. That is, personal authentication of the mobile device by using the degree of confidence is successful.

As described above, even in a time period (time t0 to time t3) in which the user carrying the mobile device is walking, the degree of similarity varies depending on the condition of walking. However, if it is determined that the mobile device is being carried by the user while the user is walking (walking state), the degree of confidence is not decreased from the previous degree of confidence by more than the third predetermined value, and therefore the success rate of personal authentication can be improved.

In a time period from time t3 to time t4, the user has stopped walking (non-walking state) and is sitting in a chair, riding on a train, or the like (carried state). In this time period, the degree of similarity is not calculated and thus is set to "0", but the degree of confidence is not immediately set to "0". The degree of confidence is decreased gradually by a first predetermined value. Accordingly, the degree of confidence is maintained at a level above the authentication threshold value for a given length of time. That is, with the personal authentication apparatus 100, if the mobile device is being carried by the user after personal authentication has been successful once, personal authentication of the mobile device by using the degree of confidence can be made successful for a given length of time.

In a time period after time t4, the mobile device is placed on a desk or the like and completely stops moving (non-walking state, non-carried state). In this time period, the degree of confidence is decreased rapidly by a second predetermined value. Accordingly, even if the mobile device is then picked up by a user who is not the authenticated user, the personal authentication apparatus 100 can cause personal authentication to fail, and thus security can be improved.

As described above, the personal authentication apparatus 100 can maintain a high level of security while increasing the probability of authentication being successful as much as possible.

As described above, with the personal authentication apparatus 100 of the present embodiment, the degree of confidence can be determined in real time based on the results of the walking state determination and the carried state determination. In the case where the walking pattern of the user changes significantly, with the conventional method that performs personal authentication by using only the degree of similarity between the motion information and the walking pattern that has been learned in advance, personal authentication fails in most of the time periods, as a result of which the convenience of the user is compromised. With the personal authentication apparatus 100 of the present embodiment, even in time periods in which the degree of similarity does not exceed the threshold value or in which the user who is carrying the mobile device is not walking, the personal authentication can be made successful.

That is, with the personal authentication apparatus 100 of the present embodiment, even in the case where the target device is not being carried by the user while the user is walking, it is possible to determine, as the degree of confidence, a value that is smaller than the previous degree of confidence by a first predetermined value, if the target device is being carried by the user. Accordingly, by appropriately setting the first predetermined value, personal authentication can be made successful even when the user who is carrying the target device is not walking, and the success rate of personal authentication can be improved. Furthermore, if the state in which the target device is not carried by the user while the user is walking continues, the degree of confidence is decreased by the first predetermined value, and it is therefore possible to suppress a reduction in security. Furthermore, when the target device is not being carried by the user, a value that is smaller than the previous degree of confidence by a second predetermined value that is greater than the first predetermined value is determined as the degree of confidence. Accordingly, the degree of confidence can be sufficiently decreased between the state in which the target device is not carried by the user and the state in which the target device is carried by the user, and it is therefore possible to improve security.

Also, with the personal authentication apparatus 100 of the present embodiment, in the case where the target device is being carried by the user while the user is walking, when the degree of similarity is less than a value that is smaller than the previous degree of confidence by a third predetermined value, it is possible to determine the value that is smaller than the previous degree of confidence by the third predetermined value, as the degree of confidence. Accordingly, even when the user walks with a walking pattern that is significantly different from the walking patterns stored in the walking pattern storage unit 104, personal authentication can be made successful, and it is therefore possible to improve the success rate of personal authentication.

In FIG. 2, steps S104 and S106 may be skipped. Specifically, the degree-of-confidence determination unit 107 may constantly determine the degree of similarity as the degree of confidence when the mobile device is in the walking state. Even in this case, the personal authentication apparatus 100 can allow personal authentication to succeed when the user who is carrying the target device is not walking, and it is therefore possible to improve the success rate of personal authentication.

Also, the walking-state determination unit 102 may determine whether or not the mobile device is being carried by a user while the user is walking by using the degree of similarity calculated by the degree-of-similarity calculation unit 103. In this case, the walking state determination processing may be performed after the degree-of-similarity calculation processing.

Also, in FIG. 2, whether or not the mobile device is in the carried state is determined after it has been determined whether or not the mobile device is in the walking state, but the order of determination does not necessarily have to be the same. In other words, the determination of whether or not the mobile device is in the walking state may be performed after the determination of whether or not the mobile device is in the carried state.

[Embodiment 2]

Embodiment 2 will be described next.

A personal authentication apparatus according to the present embodiment is different from the personal authentication apparatus of Embodiment 1 in that a new walking pattern is stored into a walking pattern storage unit based on history data of motion information or the like. Hereinafter, the personal authentication apparatus of the present embodiment will be described with reference to the drawings, focusing on the difference from the personal authentication apparatus of Embodiment 1.

Figure 4:
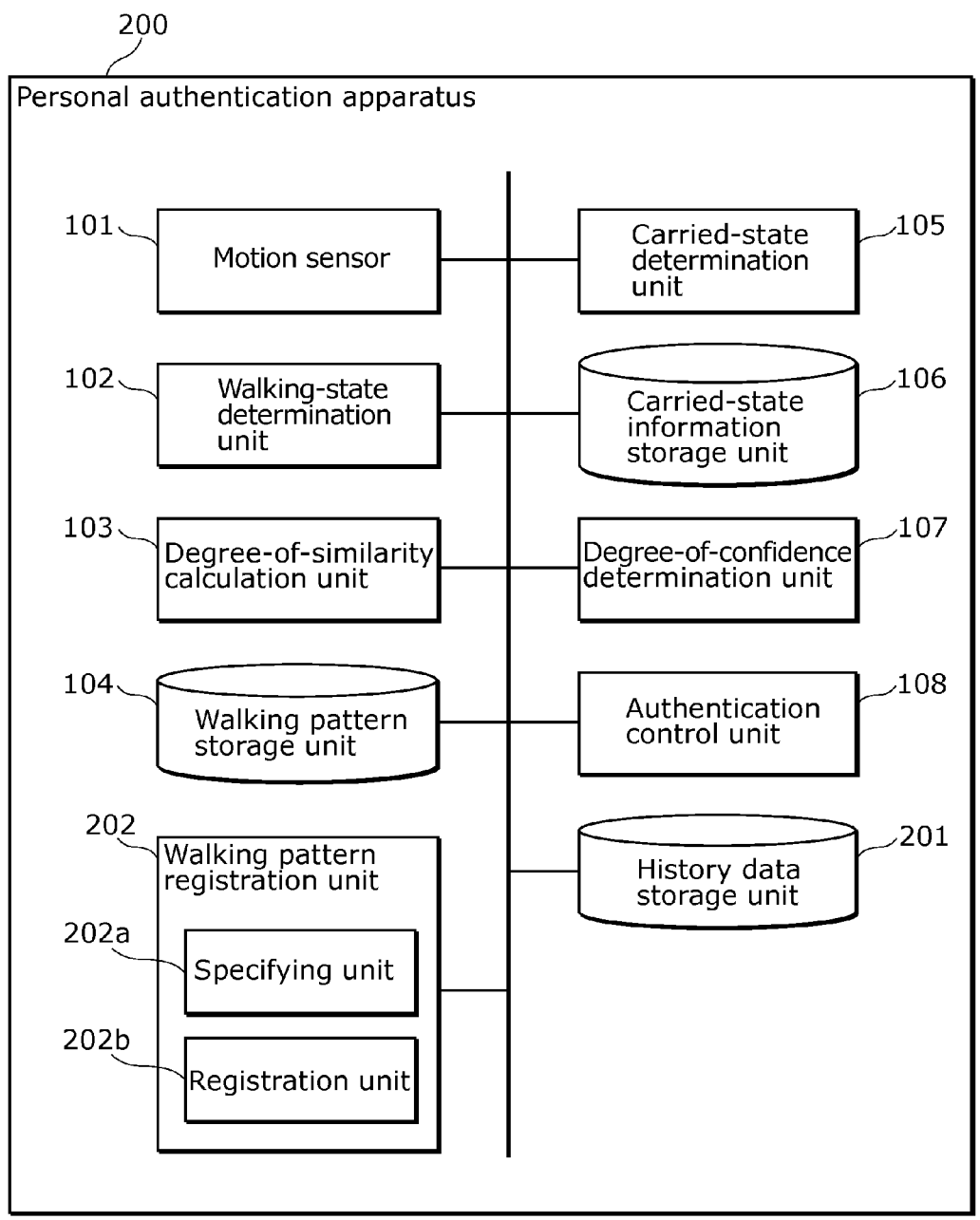
[FIG. 4]

FIG. 4 is a block diagram showing a functional configuration of a personal authentication apparatus 200 according to Embodiment 2. In FIG. 4, constituent elements that are the same as those of FIG. 1 are given the same reference numerals, and a description thereof is omitted as appropriate.

The personal authentication apparatus 200 includes a history data storage unit 201 and a walking pattern storing unit 202, in addition to the constituent elements shown in FIG. 1.

The history data storage unit 201 stores history data of at least the motion information, the degree of similarity, and the degree of confidence. Specifically, the history data storage unit 201 stores, as the history data, for example, the motion information, the degree of similarity, and the degree of confidence in association with the time at which the motion information was detected.

The walking pattern storing unit 202 stores a new walking pattern into the walking pattern storage unit 104. The walking pattern storing unit 202 includes a specifying unit 202a and a storing unit 202b.

The specifying unit 202a specifies a first time period by referring to the history data. The first time period is a time period in which it has been determined that (i) the degree of similarity is less than a first threshold value, (ii) the degree of confidence is greater than or equal to a second threshold value and (iii) the mobile device is being carried by the user while the user is walking.

The storing unit 202b stores a new walking pattern into the walking pattern storage unit 104 based on the motion information detected during the first time period, if a second time period includes a third time period in which the degree of confidence is greater than or equal to a third threshold value. As used herein, the second time period refers to a time period that includes the first time period and in which it has been continuously determined that the mobile device is being carried by the user while the user is walking. The third threshold value is greater than the second threshold value.

Next is a description of various operations of the personal authentication apparatus 200 configured as described above. The personal authentication processing is the same as that of FIG. 2, and thus a description and illustration thereof are omitted here.

Figure 5:
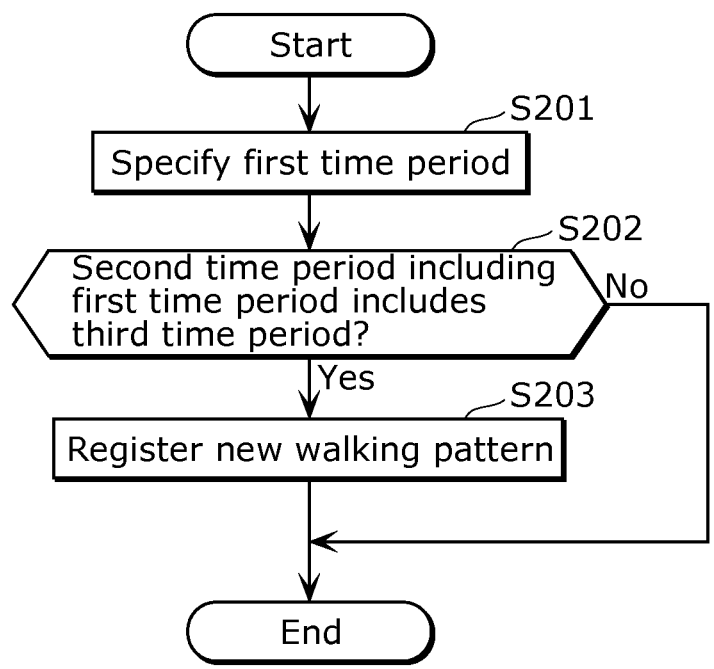
[FIG. 5]
Figure 6:
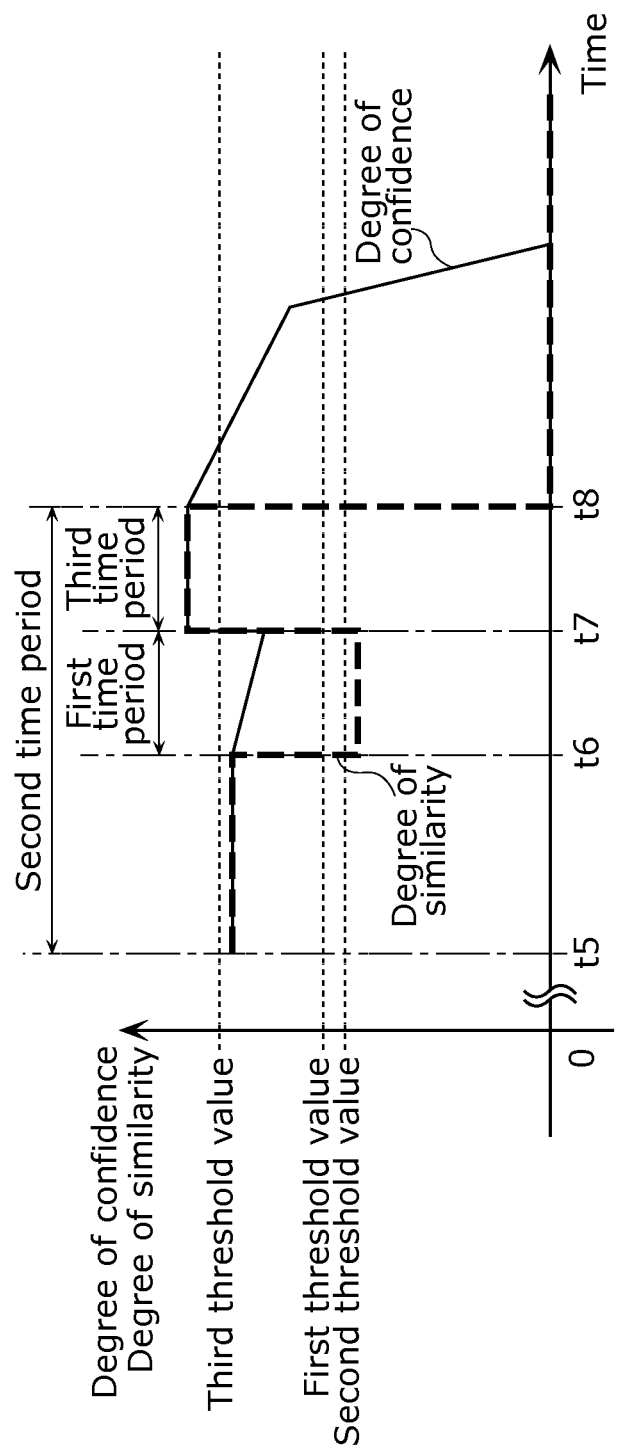
[FIG. 6]

FIG. 5 is a flowchart illustrating processing operations of the personal authentication apparatus 200 according to Embodiment 2. Specifically, FIG. 5 shows a sequence of operations of walking pattern storing processing. FIG. 6 is a diagram illustrating the walking pattern storing processing according to Embodiment 2. In the example shown in FIG. 6, in a time period from time t5 to time t8, it is assumed that it has been determined that the mobile device is being carried by the user while the user is walking.

First, the specifying unit 202a specifies the first time period by referring to the history data (S201). In the example of FIG. 6, the first time period corresponds to a time period from time t6 to time t7.

The storing unit 202b then determines whether or not the second time period includes the third time period (S202). In the example of FIG. 6, the second time period corresponds to a time period from time t5 to time t8, and the third time period corresponds to a time period from time t7 to time t8. Accordingly, it is determined that the second time period includes the third time period.

If it is determined that the second time period includes the third time period (Yes in S202), the storing unit 202b stores a new walking pattern into the walking pattern storage unit 104 based on the motion information detected during the first time period (5203). If, on the other hand, it is determined that the second time period does not include the third time period (No in S202), the personal authentication apparatus 200 immediately ends the processing.

As described above, with the personal authentication apparatus 200 of the present embodiment, in the case where the probability that the motion information indicates a walking pattern of an authenticated user is considered high, even though the degree of similarity calculated in the past was low, the motion information can be stored as a new walking pattern of the authenticated user. Accordingly, the accuracy of personal authentication can be enhanced.

That is, with the personal authentication apparatus 200 of the present embodiment, new walking patterns can be stored by using the history data. Accordingly, the number of walking patterns of the authenticated user can be increased, as a result of which the success rate of personal authentication can be improved.

In the example of FIG. 6, the first threshold value and the second threshold value are set to different values, but may be set to the same value.

Also, the present embodiment has been described with respect to the case where a new walking pattern is stored, but it may be possible to store new carried-state information in the same manner as storage of a new walking pattern. It is thereby possible to improve the accuracy of determination of the carried state.

[Embodiment 3]

Embodiment 3 will be described next.

A personal authentication apparatus according to the present embodiment is different from the personal authentication apparatus of Embodiment 2 in that a new walking pattern is stored into the walking pattern storage unit based on an instruction from the user. Hereinafter, the personal authentication apparatus of the present embodiment will be described with reference to the drawings, focusing on the difference from the personal authentication apparatus of Embodiment 2.

Figure 7:
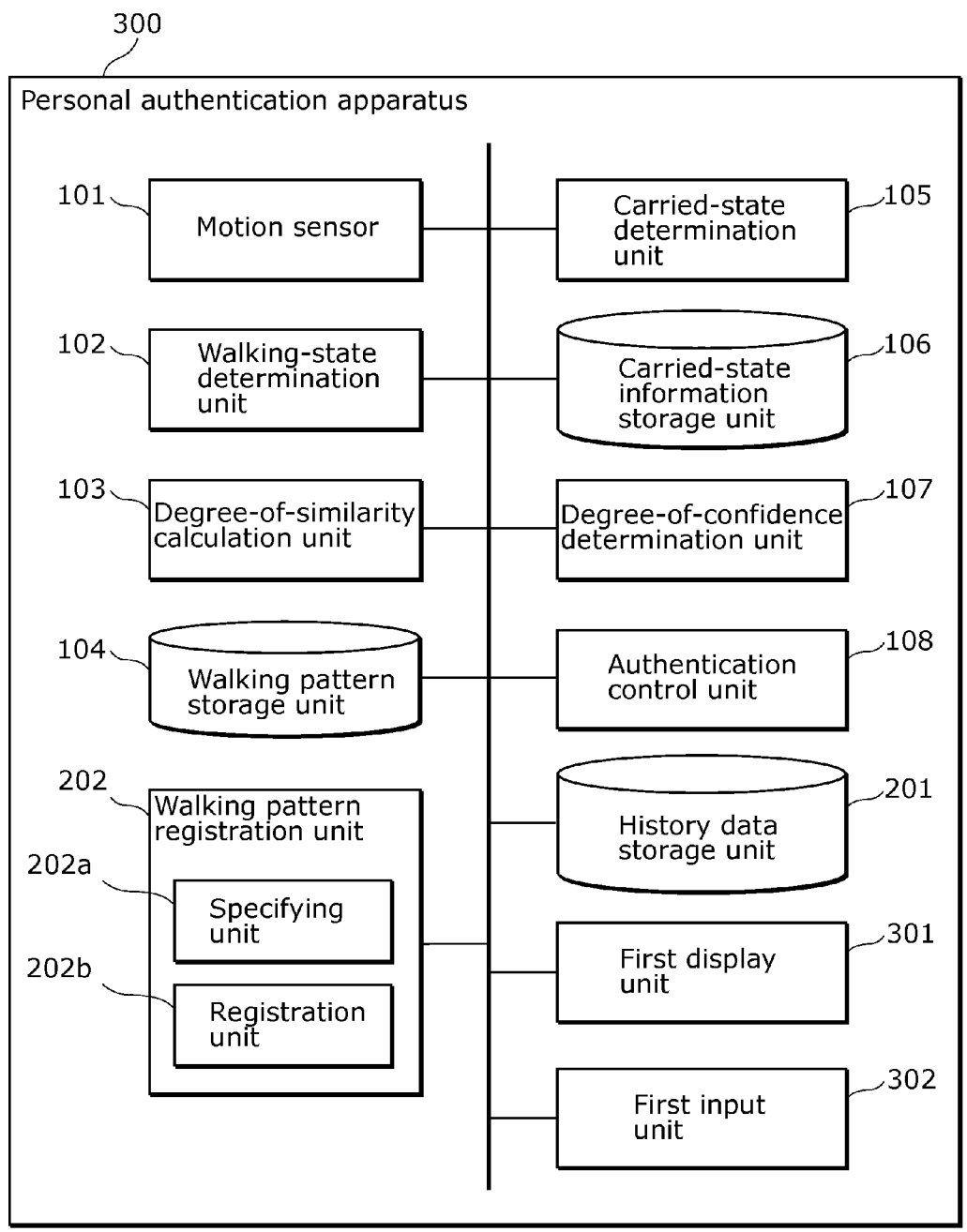
[FIG. 7]

FIG. 7 is a block diagram showing a functional configuration of a personal authentication apparatus 300 according to Embodiment 3. In FIG. 7, constituent elements that are the same as those of FIG. 1 or 4 are given the same reference numerals, and a description thereof is omitted as appropriate.

A personal authentication apparatus 300 includes a first display unit 301 and a first input unit 302 in addition to the constituent elements shown in FIG. 4.

The first display unit 301 displays a first time period on a screen. Details of the content displayed on the screen will be described later.

The first input unit 302 is a user interface for receiving first instruction information from the user. The first input unit 302 can be, for example, a touch panel, a push button, a mouse, a keyboard or the like. The first instruction information refers to information for instructing storage of a new walking pattern based on the motion information detected during the first time period displayed by the first display unit 301.

In the present embodiment, the storing unit 202b stores a new walking pattern into the walking pattern storage unit 104 based on the motion information detected during the first time period in the case where (i) the second time period includes the third time period and also (ii) the first instruction information has been received.

Next is a description of various operations of the personal authentication apparatus 300 configured as described above. The personal authentication processing is the same as that of FIG. 2, and thus a description and illustration thereof are omitted here.

Figure 8:
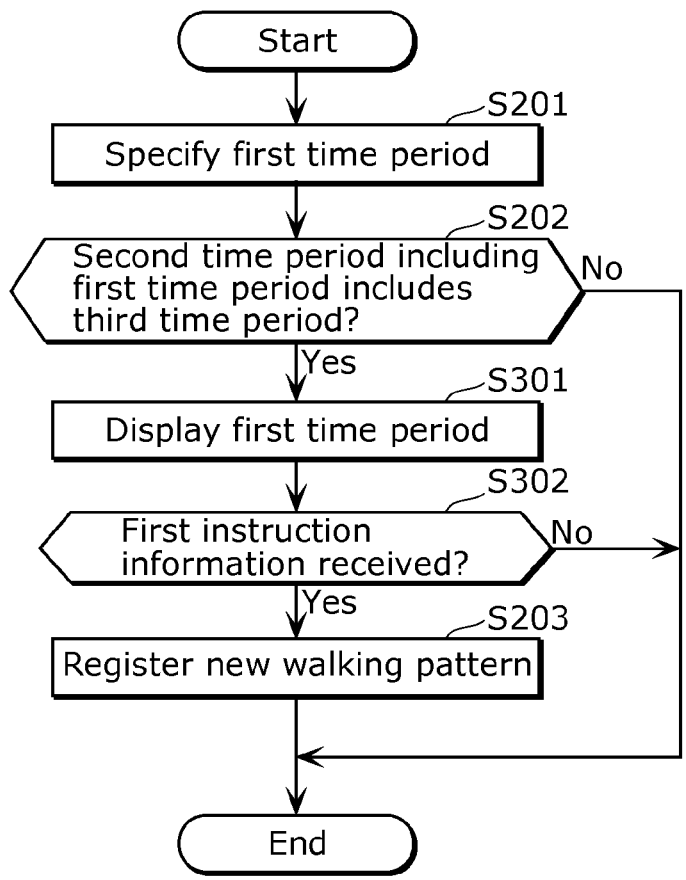
[FIG. 8]
Figure 9:
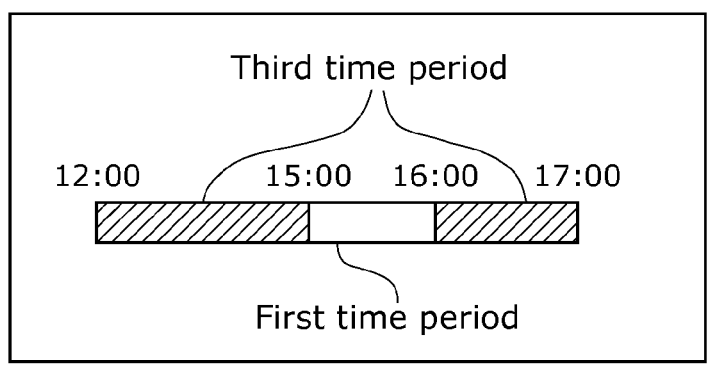
[FIG. 9]

FIG. 8 is a flowchart illustrating processing operations of the personal authentication apparatus 300 according to Embodiment 3. Specifically, FIG. 8 shows a sequence of operations of walking pattern storing processing. FIG. 9 is a diagram showing an example of the content displayed on the screen in Embodiment 3. In FIG. 8, steps that are the same as those of FIG. 5 are given the same reference numerals, and a description thereof is omitted here.

If it is determined that the second time period includes the third time period (Yes in S202), the first display unit 301 displays the first time period on the screen (S301). The first display unit 301 displays, for example, as shown in FIG. 9, the first time period and a time period in the neighborhood of the first time period (third time period in FIG. 9) on the screen.

If the first instruction information is not received while the first time period is displayed (No in S302), the personal authentication apparatus 300 immediately ends the processing. If, on the other hand, the first instruction information is received by the first input unit 302 as an input for the first time period displayed on the screen (Yes in S302), the storing unit 202b stores a new walking pattern in the walking pattern storage unit 104 based on the motion information detected during the first time period (S203). For example, in the case where the first input unit 302 is a touch panel as shown in FIG. 9, by the user touching the position of the graphic indicating the first time period, the first instruction information is received.

As described above, with the personal authentication apparatus 300 of the present embodiment, new walking patterns can be stored by feedback from the user, and it is therefore possible to perform personal authentication with higher accuracy.

That is, with the personal authentication apparatus 300 of the present embodiment, a new walking pattern can be stored when first instruction information is received from the user. Accordingly, it is possible to suppress a situation in which an inappropriate walking pattern is stored as a walking pattern of the authenticated user, as a result of which the security of personal authentication can be improved.

[Embodiment 4]

Embodiment 4 will be described next.

A personal authentication apparatus according to the present embodiment is different from the personal authentication apparatus of Embodiment 1 in that non-carried-state information that indicates motion information of when the mobile device is not being carried by the user is stored into the carried-state information storage unit based on the history data. Hereinafter, the personal authentication apparatus of the present embodiment will be described with reference to the drawings, focusing on the difference from the personal authentication apparatus of Embodiment 1.

Figure 10:
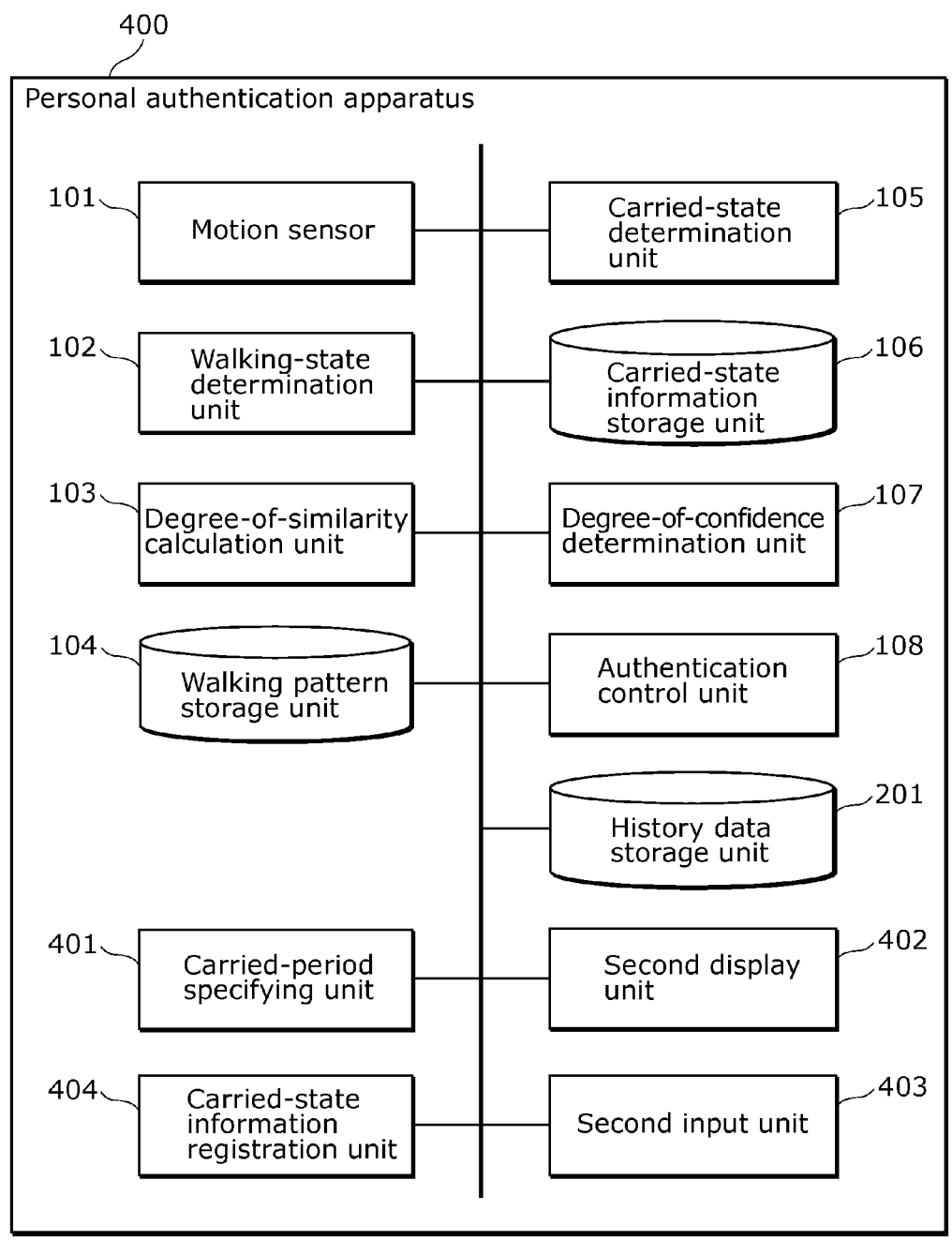
[FIG. 10]

FIG. 10 is a block diagram showing a functional configuration of a personal authentication apparatus 400 according to Embodiment 4. In FIG. 10, constituent elements that are the same as those of FIG. 1 or 4 are given the same reference numerals, and a description thereof is omitted as appropriate.

A personal authentication apparatus 400 includes a history data storage unit 201, a carried-period specifying unit 401, a second display unit 402, a second input unit 403 and a carried-state information storing unit 404, in addition to the constituent elements shown in FIG. 1.

The history data storage unit 201 stores history data of at least the motion information.

The carried-period specifying unit 401 specifies a time period in which it has been determined that the mobile device is being carried by the user as a carried period by referring to the history data stored in the history data storage unit 201.

The second display unit 402 displays the carried period specified by the carried-period specifying unit 401 to the user. For example, the second display unit 402 displays the carried period and a time period in the neighborhood of the carried period on the screen, as in FIG. 9.

The second input unit 403 is a user interface for receiving second instruction information from the user. The second input unit 403 can be, for example, a touch panel, a push button, a mouse, a keyboard or the like. The second instruction information refers to information for instructing storage of non-carried-state information into the carried-state information storage unit 106 based on the motion information detected during the displayed carried period. The non-carried-state information indicates motion information of when the mobile device is not being carried by the user.

When the second instruction information has been received, the carried-state information storing unit 404 stores the non-carried-state information into the carried-state information storage unit 106 based on the motion information detected during the carried period.

The carried-state determination unit 105 determines whether or not the mobile device is being carried by the user by using the non-carried-state information stored in the carried-state information storage unit 106. For example, the carried-state determination unit 105 calculates the degree of similarity between the detected motion information and the non-carried-state information, and if the calculated degree of similarity is greater than or equal to a predetermined threshold value, determines that the mobile device is not being carried by the user.

Next is a description of various operations of the personal authentication apparatus 400 configured as described above. The personal authentication processing is the same as that of FIG. 2, and thus a description and illustration thereof are omitted here.

Figure 11:
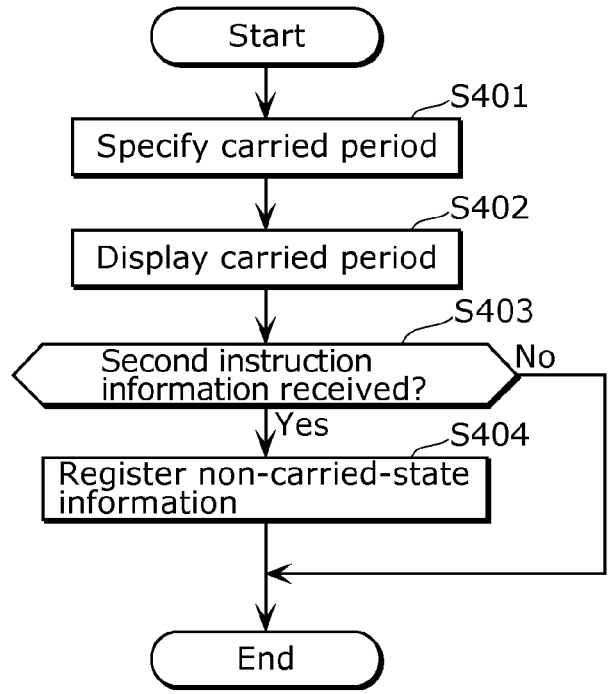
[FIG. 11]

FIG. 11 is a flowchart illustrating processing operations of the personal authentication apparatus 400 according to Embodiment 4. Specifically, FIG. 11 shows a sequence of operations of non-carried-state information storing processing.

First, the carried-period specifying unit 401 specifies a time period in which it has been determined that the mobile device is being carried by the user, as a carried period by referring to the history data (S401). The second display unit 402 then displays the specified carried period to the user (S402).

If the second instruction information is not received while the carried period is displayed (No in S403), the personal authentication apparatus 400 immediately ends the processing. If, on the other hand, the second instruction information is received by the second input unit 403 as an input for the carried period displayed on the screen (Yes in S403), the non-carried-state information is stored into the carried-state information storage unit 106 based on the motion information detected during the carried period (S404).

As described above, with the personal authentication apparatus 400 of the present embodiment, the non-carried-state information can be stored by using the history data. In the case where the target device has been left in a train, for example, the target device will vibrate, making it likely that it is erroneously determined that the target device is being carried by the user. As described above, the non-carried-state information can be stored by using the motion information detected when it has been erroneously determined that the target device is being carried by the user, and it is therefore possible to improve the accuracy of determination of the carried state as well as improving the security of personal authentication.

[Embodiment 5]

Embodiment 5 will be described next.

A personal authentication apparatus according to the present embodiment is different from the personal authentication apparatus of Embodiment 1 in that the authenticated state is controlled based on whether or not the target device is in the carried state regardless of whether or not the target device is in the walking state. Hereinafter, the personal authentication apparatus of the present embodiment will be described with reference to the drawings, focusing on the difference from the personal authentication apparatus of Embodiment 1.

Figure 12:
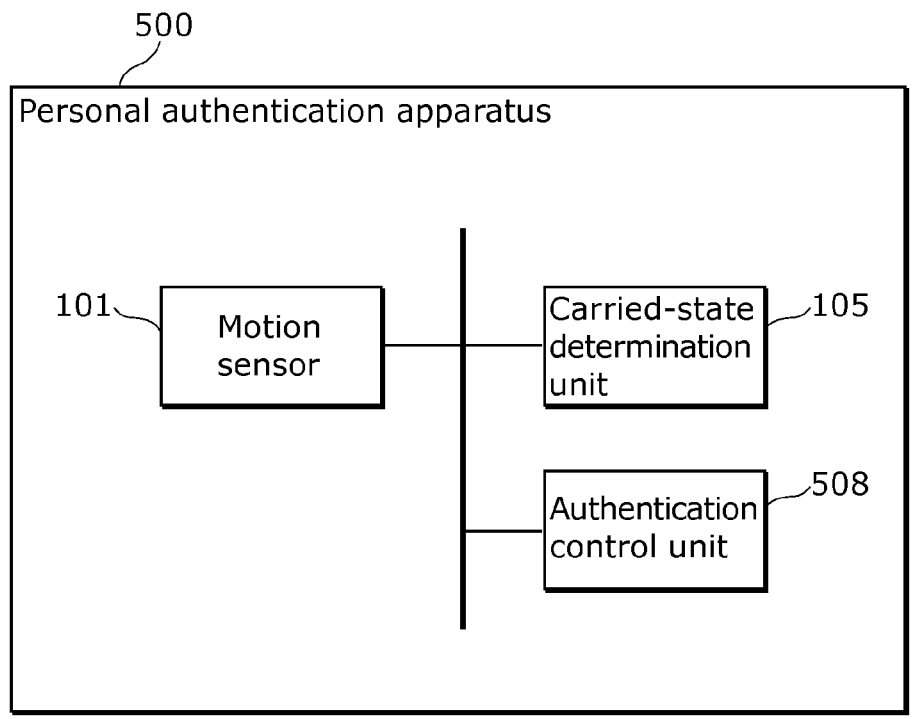
[FIG. 12]

FIG. 12 is a block diagram showing a functional configuration of a personal authentication apparatus 500 according to Embodiment 5. In FIG. 12, constituent elements that are the same as those of FIG. 1 are given the same reference numerals, and a description thereof is omitted as appropriate.

A personal authentication apparatus 500 includes the motion sensor 101, the carried-state determination unit 105 and an authentication control unit 508.

The authentication control unit 508 controls the authenticated state of the target device based on the result of the determination by the carried-state determination unit 105. For example, the authentication control unit 508 continues the authenticated state of the target device if it is determined that the target device is being carried by the user when the target device is in the authenticated state. If, for example, it is determined that the target device is not being carried by the user when the target device is in the authenticated state, the authentication control unit 508 suspends the authenticated state of the target device.

Next is a description of various operations of the personal authentication apparatus 500 configured as described above.

Figure 13:
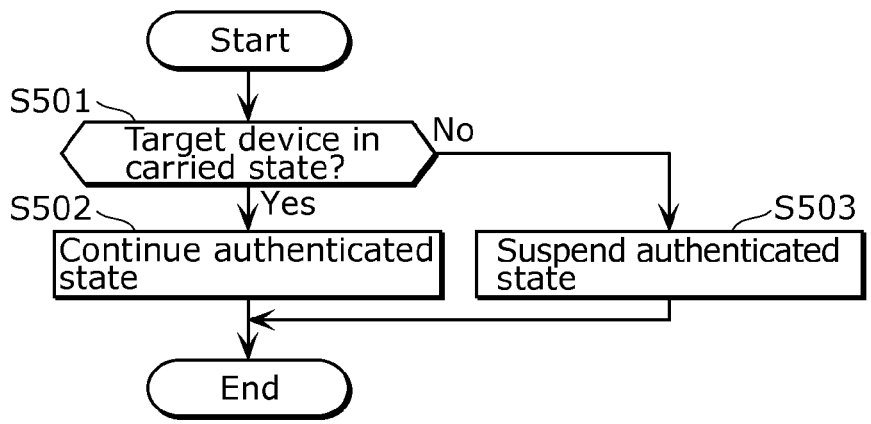
[FIG. 13]

FIG. 13 is a flowchart illustrating processing operations of the personal authentication apparatus 500 according to Embodiment 5. Specifically, FIG. 13 shows a sequence of operations of personal authentication processing performed when the target device is in the authenticated state. Specifically, FIG. 13 shows processing performed after the state of the target device has been set to the authenticated state through, for example, personal authentication using a password.

First, the carried-state determination unit 105 determines whether or not the target device is being carried by the user based on the motion information (S501). In other words, the carried-state determination unit 105 determines whether or not the target device is in the carried state.

For example, the carried-state determination unit 105 may determine that the target device is not being carried by the user if the acceleration indicated by the motion information is less than or equal to a threshold value for a predetermined length of time. In this case, the motion sensor is an acceleration sensor. It is sufficient that the threshold value is determined in advance empirically or experimentally based on, for example, the acceleration detected when the target device is in the carried state or in the non-carried state.

Also, it is sufficient that the predetermined length of time is determined in advance empirically or experimentally based on, for example, temporal changes in the acceleration detected when the target device is in the carried state or in the non-carried state. Alternatively, the predetermined length of time may be set based on, for example, the security and the success rate of personal authentication. For example, in the case where priority is given to the improvement of security, the predetermined length of time may be set shorter than in the case where priority is given to the success rate of personal authentication.

As a result of the threshold value and the predetermined length of time being appropriately set in the manner described above, the carried-state determination unit 105 can determine with high accuracy whether or not the target device is being carried by the user.

If it is determined that the target device is in the carried state (Yes in S501), the authentication control unit 508 continues the authenticated state of the target device (S502). In other words, the authentication control unit 508 maintains the authenticated state.

If, on the other hand, it is determined that the target device is not in the carried state (No in S501), the authentication control unit 508 suspends the authenticated state of the target device (S503). In other words, the authentication control unit 508 changes the state of the target device from the authenticated state to the non-authenticated state.

As described above, with the personal authentication apparatus 500 of the present embodiment, it is possible to continue the authenticated state of the target device when it has been determined that the target device is being carried by the user. Accordingly, the convenience of the user can be improved while suppressing a reduction in security.

Furthermore, with the personal authentication apparatus 500 of the present embodiment, the authenticated state of the target device can be suspended when it has been determined that the target device is not being carried by the user. Accordingly, it is possible to prevent the target device from being left unattended while the target device is in the authenticated state, and thus a reduction in security can be suppressed.

In the present embodiment, the personal authentication apparatus 500 suspends the authenticated state of the target device when it has been determined that the target device is not in the carried state, but the personal authentication apparatus 500 does not necessarily have to immediately suspend the authenticated state. For example, as in Embodiment 1, the personal authentication apparatus 500 may determine the degree of confidence based on whether or not the target device is in the carried state and control the authenticated state based on the determined degree of confidence.

Specifically, the personal authentication apparatus 500 may include a degree-of-confidence determination unit. In this case, the degree-of-confidence determination unit may (i) determine a value that is smaller than the previous degree of confidence by a first predetermined value as the degree of confidence if it is determined that the target device is being carried by the user and (ii) determine a value that is smaller than the previous degree of confidence by a second predetermined value that is greater than the first predetermined value as the degree of confidence if it is determined that the target device is not being carried by the user. With this configuration, the degree of confidence can be lowered more rapidly when the target device is not being carried by the user than when the target device is being carried by the user. By performing personal authentication based on the degree of confidence determined in the above manner, it is possible to improve the success rate of personal authentication while suppressing a reduction in security.

The foregoing has described the personal authentication apparatus(es) according to one or more aspects of the present invention based on the above embodiments, but the present invention is not limited to these embodiments. Embodiments implemented by making various modifications conceived by a person skilled in the art to any of the embodiments described herein or embodiments configured by combining the constituent elements of different embodiments without departing from the spirit of the present invention may also fall within the scope of one or more aspects of the present invention.

For example, the personal authentication apparatus may include all of the constituent elements of the personal authentication apparatuses 300 and 400 of Embodiments 3 and 4 described above.

Also, in Embodiments 1 to 4 given above, the personal authentication apparatus includes the walking pattern storage unit 104 and the carried-state information storage unit 106, but it does not necessarily have to include these constituent elements. For example, the walking pattern storage unit 104 and the carried-state information storage unit 106 may be a recording medium removable from the personal authentication apparatus. Alternatively, for example, the walking pattern storage unit 104 and the carried-state information storage unit 106 may be included in a storage device connected via a network. In this case, the personal authentication apparatus may include an interface for reading out data recorded in the removable recording medium or a communication interface for acquiring data from the storage device via the network.

Also, the embodiments given above have been described with respect to an example in which the personal authentication apparatus is mounted in a mobile device, but the personal authentication apparatus does not necessarily have to be mounted in a mobile device. The personal authentication apparatus may be implemented as, for example, an apparatus separate from the target device such as a mobile device.

It is also possible that some or all of the constituent elements of the personal authentication apparatus of each embodiment given above are configured as a single system LSI (Large Scale Integration). For example, the personal authentication apparatus may be constituted by a system LSI including a carried-state determination unit and an authentication control unit. A system LSI is a super-multifunctional LSI produced by integration of a plurality of constituent elements on a single chip, and can specifically be a computer system including a microprocessor, a ROM (Read Only Memory), a RAM (Ramdom Access Memory) and the like. The ROM stores a computer program. The system LSI implements its function by the microprocessor operating in accordance with the computer program.

The above example has been discussed using a system LSI, but the system LSI may be called IC, LSI, super LSI, or ultra LSI according to the degree of integration. The method for implementing an integrated circuit is not limited to an LSI, and the integration circuit may be implemented by a dedicated circuit or a general-purpose processor. It is also possible to use an FPGA (Field Programmable Gate Array) that can be programmed after LSI production or a reconfigurable processor that enables reconfiguration of the connection and setting of circuit cells in the LSI.

Furthermore, if a technique for implementing an integrated circuit that can replace LSIs appears by another technique resulting from the progress or derivation of semiconductor technology, the functional blocks may of course be integrated by using that technique. Application of biotechnology or the like is possible.

An aspect of the present invention may be a personal authentication method in which the distinctive processing units of the personal authentication apparatus are configured as steps. Alternatively, an aspect of the present invention may be a computer program that causes a computer to execute the distinctive steps of the personal authentication method. Alternatively, an aspect of the present invention may be a computer-readable non-transient recording medium in which such a computer program is recorded, such as a CD-ROM.

The constituent elements of the embodiments given above may be configured by dedicated hardware or a software program suitable for the constituent elements. The constituent elements may be implemented by a program executing unit such as a CPU or a processor reading out and executing a software program recorded in a recording medium such as a hard disk or a semiconductor memory. In this case, the software that implements the personal authentication apparatus or the like according to any of the above embodiments can be a program as described below.

Specifically, the program causes a computer to execute a personal authentication method for controlling an authenticated state of a target device based on motion of the target device, the method including determining whether or not the target device is being carried by a user based on motion information indicating motion of the target device, and controlling the authenticated state of the target device based on a result of determination in the carried-state determination.

INDUSTRIAL APPLICABILITY

The personal authentication apparatus according to an aspect of the present invention is useful as an apparatus that controls the authenticated state of a target device based on the motion information of the target device, and can be used in particular in a mobile device such as a smart phone or a cell phone.

REFERENCE SIGNS LIST 100, 200, 300, 400, 500 Personal authentication apparatus
101 Motion sensor
102 Walking-state determination unit
103 Degree-of-similarity calculation unit
104 Walking pattern storage unit
105 Carried-state determination unit
106 Carried-state information storage unit
107 Degree-of-confidence determination unit
108, 508 Authentication control unit
201 History data storage unit
202 Walking pattern storing unit
202a Specifying unit
202b Storing unit
301 First display unit
302 First input unit
401 Carried-period specifying unit
402 Second display unit
403 Second input unit
404 Carried-state information storing unit

The invention claimed is:

1. A personal authentication apparatus that controls an authenticated state of a target device based on motion of the target device, the apparatus comprising:
a motion sensor that detects motion information indicating the motion of the target device; and
a processor executing instructions implementing:
a carried-state determination unit configured to determine whether or not the target device is being carried by a user based on the detected motion information;
a degree-of-confidence determination unit configured to determine a degree of confidence that indicates a level of certainty that the target device is being carried by an authenticated user based on a result of the determination by the carried-state determination unit; and
an authentication control unit configured to control the authenticated state of the target device based on the determined degree of confidence,
wherein the degree-of-confidence determination unit is configured to:
repeatedly make the determination of the degree of confidence over time
determine a value that is smaller than a previously determined degree of confidence by a first predetermined value as a current degree of confidence, when the carried-state determination unit determines that the target device is being carried by the user; and
determine a value that is smaller than the previously determined degree of confidence by a second predetermined value that is greater than the first predetermined value as the current degree of confidence, when the carried-state determination unit determines that the target device is not being carried by the user.

2. The personal authentication apparatus according to claim 1,
wherein the processor further executes instructions implementing:
a walking-state determination unit configured to determine whether or not the target device is being carried by the user while the user is walking based on the detected motion information; and
a degree-of-similarity calculation unit configured to calculate a degree of similarity between the detected motion information and a walking pattern of the authenticated user stored in a walking pattern storage unit, when the walking-state determination unit determines that the target device is being carried by the user while the user is walking, and
wherein the degree-of-confidence determination unit is configured to:
(i) determine the current degree of confidence based on the calculated degree of similarity, when the walking-state determination unit determines that the target device is being carried by the user while the user is walking;
(ii) determine a value that is smaller than the previous degree of confidence by the first predetermined value as the current degree of confidence, when the walking-state determination unit determines that the target device is not being carried by the user while the user is walking and the carried-state determination unit determines that the target device is being carried by the user; and
(iii) determine a value that is smaller than the previous degree of confidence by the second predetermined value as the current degree of confidence, when the walking-state determination unit determines that the target device is not being carried by the user while the user is walking and the carried-state determination unit determines that the target device is not being carried by the user.

3. The personal authentication apparatus according to claim 2, wherein when the walking-state determination unit determines that the target device is being carried by the user while the user is walking, the degree-of-confidence determination unit is configured to:
(i) determine the degree of similarity as the degree of confidence, when a current degree of similarity is greater than or equal to a value that is smaller than the previous degree of confidence by a third predetermined value that is smaller than the first and second predetermined values; and
(ii) determine the value that is smaller than the previous degree of confidence by the third predetermined value as the current degree of confidence, when the current degree of similarity is less than the value that is smaller than the previous degree of confidence by the third predetermined value.

4. The personal authentication apparatus according to claim 2,
wherein the processor further executes instructions implementing a walking pattern storing unit configured to store a new walking pattern into the walking pattern storage unit, and
wherein the walking pattern storing unit includes:
a specifying unit configured to specify as a first time period, by referring to history data of the motion information, the degree of similarity and the degree of confidence, a time period in which (i) the degree of similarity is determined to be less than a first threshold value, (ii) the degree of confidence is determined to be greater than or equal to a second threshold value and (iii) the walking-state determination unit determines that the target device is being carried by the user while the user is walking; and
a storing unit configured to store the new walking pattern into the walking pattern storage unit based on the motion information detected during the first time period, when a second time period includes a third time period in which the degree of confidence is greater than or equal to a third threshold value that is greater than the second threshold value, the second time period being a time period that includes the first time period and in which the walking-state determination unit continuously determines that the target device is being carried by the user while the user is walking.

5. The personal authentication apparatus according to claim 4,
wherein the processor further executes instructions implementing:
a first display unit configured to display the first time period on a screen; and
a first input unit configured to receive, from the user, first instruction information for instructing storage of the new walking pattern based on the motion information detected during the displayed first time period, and
wherein the storing unit is configured to store the new walking pattern into the walking pattern storage unit when (i) the second time period includes the third time period and (ii) the first instruction information is received.

6. The personal authentication apparatus according to claim 1, wherein the authentication control unit is configured to continue the authenticated state of the target device when the walking-state determination unit determines that the target device is being carried by the user while the target device is in the authenticated state.

7. The personal authentication apparatus according to claim 6, wherein the authentication control unit is configured to suspend the authenticated state of the target device, when the walking-state determination unit determines that the target device is not being carried by the user while the target device is in the authenticated state.

8. The personal authentication apparatus according to claim 1,
wherein the processor further executes instructions implementing:
a carried-period specifying unit configured to specify as a carried period, a time period in which the walking-state determination unit determines that the target device is being carried by the user, by referring to history data of the motion information;
a second display unit configured to display the specified carried period to the user;
a second input unit configured to receive, from the user, second instruction information for instructing storage of non-carried-state information into a carried-state information storage unit based on the motion information detected during the displayed carried period, the non-carried-state information indicating motion information of when the target device is not being carried by the user; and
a carried-state information storing unit configured to store the non-carried-state information into the carried-state information storage unit based on the motion information detected during the carried period when the second instruction information has been received, and wherein the carried-state determination unit is configured to determine whether or not the target device is being carried by the user by using the non-carried-state information stored in the carried-state information storage unit.

9. The personal authentication apparatus according to claim 1, wherein the motion sensor is an acceleration sensor, and the carried-state determination unit is configured to determine that the target device is not being carried by the user when an acceleration indicated by the motion information is less than or equal to a threshold value for a predetermined length of time.

10. An integrated circuit that controls an authenticated state of a target device based on motion of the target device, the integrated circuit comprising:

a processor executing instructions implementing:

a carried-state determination unit configured to determine whether or not the target device is being carried by a user based on motion information that indicates the motion of the target device;

a degree-of-confidence determination unit configures to determine a degree of confidence that indicates a level of certainty that the target device is being carried by an authenticated user based on a result of the determination by the carried-state determination unit; and an authentication control unit configured to control the authenticated state of the target device based on the determined degree of confidence, wherein the degree-of-confidence determination unit is configured to:

repeatedly make the determination of the degree of confidence over time;

determine a value that is smaller than a previously determined degree of confidence by a first predetermined value as a current degree of confidence, when the carried-state determination unit determines that the target device is being carried by the user; and determine a value that is smaller than the previously determined degree of confidence by a second predetermined value that is greater than the first predetermined value as the current degree of confidence, when the carried-state determination unit determines that the target device is not being carried by the user.

11. A personal authentication method performed by a processor in a personal authentication apparatus for controlling an authenticated state of a target device based on motion of the target device, the method comprising:

determining, via the processor, whether or not the target device is being carried by a user based on motion information that indicates the motion of the target device;

determining, via the processor, a degree of confidence that indicates a level of certainty that the target device is being carried by an authenticated user based on a result of the determining of whether or not the target device is being carried by the user; and controlling, via the processor, the authenticated state of the target device based on the determined degree of confidence, wherein, in the determining of the degree of confidence:

the determining of the degree of confidence is repeatedly performed over time;

a value that is smaller than a previously determined degree of confidence by a first predetermined value is determined as a current degree of confidence, when the determining of whether or not the target device is being carried by the user determines that the target device is being carried by the user; and a value that is smaller than the previously determined degree of confidence by a second predetermined value that is greater than the first predetermined value is determined as the current degree of confidence, when the determining of whether or not the target device is being carried by the user determines that the target device is not being carried by the user.

12. A non-transitory computer-readable recording medium on which a program is recorded, the program causing a computer to execute the personal authentication method according to claim 11.

* * * * *